United States Patent [19]

Kedem et al.

[11] Patent Number: 5,778,436

[45] Date of Patent: Jul. 7, 1998

[54] PREDICTIVE CACHING SYSTEM AND METHOD BASED ON MEMORY ACCESS WHICH PREVIOUSLY FOLLOWED A CACHE MISS

[75] Inventors: Gershon Kedem, Chapel Hill; Thomas Alexander, Durham, both of N.C.

[73] Assignee: Duke University, Durham, N.C.

[21] Appl. No.: 978,320

[22] Filed: Nov. 25, 1997

Related U.S. Application Data

[63] Continuation of Ser. No. 398,428, Mar. 6, 1995, abandoned.

[51] Int. Cl.⁶ .................................................. G06F 12/12
[52] U.S. Cl. ........................................ 711/137; 711/122
[58] Field of Search ................................ 711/137, 204, 711/213, 216, 122, 105; 395/584, 585, 586, 587

[56] References Cited

U.S. PATENT DOCUMENTS

| | | | |
|---|---|---|---|
| 4,807,110 | 2/1989 | Pomerane et al. | 711/213 |
| 4,860,199 | 8/1989 | Langendorf et al. | 711/213 |
| 5,148,538 | 9/1992 | Celtruda et al. | 711/205 |
| 5,210,845 | 5/1993 | Crawford et al. | 395/307 |
| 5,305,389 | 4/1994 | Palmer | 382/1 |
| 5,418,922 | 5/1995 | Liu | 711/3 |
| 5,499,355 | 3/1996 | Krishnamohan et al. | 711/137 |
| 5,521,878 | 5/1996 | Ohtani et al. | 365/233 |
| 5,530,941 | 6/1996 | Weisser et al. | 711/151 |

FOREIGN PATENT DOCUMENTS

WO 93/18459   9/1993   WIPO.

OTHER PUBLICATIONS

Lopriore, Line Fetch/Prefetch in a Stack Cache Memory, Microprocessors and Microsystems, vol. 17, No. 9, Nov. 1993, pp. 547–555.

Eickemeyer et al., A Load–Instruction Unit for Pipelined Processers, IBM J. Res. Develop., vol. 37, No. 4, Jul. 1993, pp. 547–564.

Nowicki, Masters Thesis: The Design and Implementation of a Read Prediction Buffer, Navel Postgraduate School, Monterey, California, 1992.

Palmer et al., *Fido: A Cache that Learns to Fetch*, Proceedings of the 17th International Conference on Very Large Data Bases, Sep. 1991, pp. 255–264.

Vitter et al., Optimal Prefetching Via Data Compression, Technical Report No. CS-91-46, Computer Science Department, Brown University, 1991.

*Primary Examiner*—Eddie P. Chan
*Assistant Examiner*—Reginald G. Bragdon
*Attorney, Agent, or Firm*—Myers Bigel Sibley & Sajovec

[57] ABSTRACT

Predictive cache memory systems and methods are responsive to cache misses to prefetch a data block from main memory based upon the data block which last followed the memory address which caused the cache miss. In response to an access request to main memory for a first main memory data block, which is caused by a primary cache miss, a second main memory data block is identified which was accessed following a previous access request to the main memory for the first main memory data block. Once identified, the second memory data block is stored in a predictive cache if the second main memory data block is not already stored in the predictive cache. Thus, if the next main memory request is for the second main memory block, as was earlier predicted, the second main memory block is already in the predictive cache and may be accessed rapidly. The identification of data blocks for prefetching may be provided by a prediction table which stores therein identifications of a plurality of succeeding main memory data blocks, each of which was accessed following an access request to a corresponding one of a plurality of preceding main memory data blocks. The Prediction Table is updated if predictions are incorrect. The predictive cache may be implemented using on-chip SRAM cache which is integrated with a DRAM array so that transfers between the DRAM array and the predictive cache may occur at high speed using an internal buffer.

22 Claims, 11 Drawing Sheets

PREDICTIVE CACHING SYSTEM AND METHOD BASED ON MEMORY ACCESS WHICH PREVIOUSLY FOLLOWED A CACHE MISS

This application is a continuation of application Ser. No. 08/398,428, filed Mar. 6, 1995, now abandoned.

FIELD OF THE INVENTION

This invention relates to cache memory systems and methods, and more particularly to predictive cache memory systems and methods.

BACKGROUND OF THE INVENTION

Cache memory has long been used in data processing systems to improve the performance thereof. A cache memory is a relatively high speed, relatively small memory in which active portions of program instructions and/or data are placed. The cache memory is typically faster than main memory by a factor of up to ten or more, and typically approaches the speed of the processor itself. By keeping the most frequently accessed instructions and/or data in the high speed cache memory, the average memory access time approaches the access time of the cache.

The need for cache memory continues even as the speed and density of microelectronic devices improve. In particular, as microelectronic technology improves, processors are becoming faster. Every new generation of processors is about twice as fast as the previous generation, due to the shrinking features of integrated circuits. Unfortunately, memory speed has not increased concurrently with microprocessor speed. While Dynamic Random Access Memory (DRAM) technology rides the same technological curve as microprocessors, technological improvements yield denser DRAMs, but not substantially faster DRAMs. Thus, while microprocessor performance has improved by a factor of about one thousand in the last ten to fifteen years, DRAM speeds have improved by only 50%. Accordingly, there is currently about a twenty-fold gap between the speed of present day microprocessors and DRAM. In the future this speed discrepancy between the processor and memory will likely increase.

Caching reduces this large speed discrepancy between processor and memory cycle times by using a fast static memory buffer to hold a small portion of the instructions and/or data that are currently being used. When the processor needs a new instruction and/or data, it first looks in the cache. If the instruction and/or data is in the cache (referred to a cache "hit"), the processor can obtain the instruction and/or data quickly and proceed with the computation. If the instruction and/or data is not in the cache (referred to a cache "miss"), the processor must wait for the instruction and/or data to be loaded from main memory.

Cache performance relies on the phenomena of "locality of reference". The locality of reference phenomena recognizes that most computer program processing proceeds in a sequential fashion with multiple loops, and with the processor repeatedly accessing a set of instructions and/or data in a localized area of memory. In view of the phenomena of locality of reference, a small, high speed cache memory may be provided for storing data blocks containing data and/or instructions from main memory which are presently being processed. Although the cache is only a small fraction of the size of main memory, a large fraction of memory requests will locate data or instructions in the cache memory, because of the locality of reference property of programs.

Unfortunately, many programs do not exhibit sufficient locality of reference to benefit significantly from conventional caching. For example, many large scale applications, such as scientific computing, Computer-Aided Design (CAD) applications and simulation, typically exhibit poor locality of reference and therefore suffer from high cache miss rates. These applications therefore tend to run at substantially lower speed than the processor's peak performance.

In an attempt to improve the performance of a cache, notwithstanding poor locality of reference, "predictive" caching has been used. In predictive caching, an attempt is made to predict where a next memory access will occur, and the potential data block of memory is preloaded into the cache. This operation is also referred to as "prefetching". Unfortunately, predictive caching schemes may often perform poorly because of the difficulty in predicting where a next memory access will occur. Performance may be degraded for two reasons. First, the predicting system may inaccurately predict where a next memory access will occur, so that incorrect data blocks of memory are prefetched. Moreover, the prediction computation itself may be so computationally intensive as to degrade overall system response.

One predictive caching scheme attempts to dynamically detect "strides" in a program in order to predict a future memory access. See, for example, International Patent Application WO 93/18459 to Krishnamohan et al. entitled "*Prefetching Into a Cache to Minimize Main Memory Access Time and Cache Size in a Computer System*" and Eickemeyer et al. "*A Load Instruction Unit for Pipeline Processors*", IBM Journal of Research and Development, Vol. 37, No. 4, July 1993, pp. 547–564. Unfortunately, as described above, prediction based on program strides may only be accurate for highly regular programs. Moreover, the need to calculate a program stride during program execution may itself decrease the speed of the caching system.

Another attempt at predictive caching is described in U.S. Pat. No. 5,305,389 to Palmer entitled "*Predictive Cache System*". In this system, prefetches to a cache memory subsystem are made from predictions which are based on access patterns stored by context. An access pattern is generated from prior accesses of a data processing system processing in a like context. During a training sequence, an actual trace of memory accesses is processed to generate unit patterns which serve in making future predictions and to identify statistics such as pattern accuracy for each unit pattern. Again, it may be difficult to accurately predict performance for large scale applications. Moreover, the need to provide training sequences may require excessive overhead for the system.

SUMMARY OF THE INVENTION

It is therefore an object of the invention to provide improved predictive caching systems and methods for prefetching data blocks in a cache memory subsystem.

It is another object of the invention to provide predictive caching systems and methods which do not require analysis of a program or training modes to determine strides or other characteristics of a program.

It is yet another object of the present invention to provide improved cache prefetching systems and methods which efficiently and accurately prefetch data blocks while executing programs which exhibit poor locality of reference.

These and other objects are provided, according to the present invention, by predictive cache memory systems and methods which are responsive to cache misses for prefetching a data block from main memory based upon the data block which last followed the memory address which caused the cache miss. Predictive cache memory systems and methods of the present invention need only monitor cache misses so that they require little or no overhead when cache hits are occurring. Moreover, the prediction may use a lookup table which maintains a listing of sequential data block access requests which followed previous cache misses. Thus, complex calculations to determine strides and/or complex training schemes are not required. Prediction determination therefore requires little overhead. Finally, it has been found that by basing a cache prefetch on the data block which was last accessed following the same cache miss, highly accurate predictions may be provided, especially for large scale computing applications. Improved data processing system performance is thereby provided.

In particular, according to the present invention, a cache memory stores therein data blocks from main memory. In response to an access request to main memory for a first main memory data block, which is caused by a cache miss, a second main memory data block is identified which was accessed following a previous access request to the main memory for the first main memory data block. Once identified, the second main memory data block is stored in the cache memory if the second main memory data block is not already stored in the cache memory. Thus, if the next main memory request is for the second main memory block, as was earlier predicted, the second main memory block is already in cache memory and may be used for access. In contrast, if the next access request to main memory is for a third main memory data block, the third main memory block is obtained from main memory and stored in the cache, and the identification of the second main memory data block is replaced with an identification of the third main memory data block.

In a particular embodiment of the present invention, identification of data blocks for prefetching is provided by a Prediction Table. The Prediction Table stores therein identifications of a plurality of succeeding main memory data blocks, each of which was accessed following an access request to a corresponding one of a plurality of preceding main memory data blocks. In response to an access request to the first main memory data block, a determination is made if the Prediction Table includes identification of the second memory data block corresponding to the first main memory data block. For example, the address bits for the first main memory data block may be used to index into the Prediction Table, and the contents at that index into the Prediction Table provides the address of the second main memory data block which is to be prefetched.

If the Prediction Table contains an identification of the second main memory data block, a determination is made if the second main memory data block is already stored in the cache memory If it is not already stored in the cache memory, the second data block is prefetched and stored in the cache memory. The Prediction Table is updated in response to the actual data block which was accessed after the first main memory data block. If the next access request is for the second main memory data block, the prediction was correct and the Prediction Table need not be updated. However, if the next access request is for a third data block, an identification of the third data block is stored in the Prediction Table as the identification corresponding to the first data block. Thus, if the prefetch was incorrect, the Prediction Table is updated based on the actual data block access sequence.

The invention is preferably implemented in a distributed cache system which includes a first (primary) cache memory and a second (predictive) cache memory. It will be understood that the term "primary" is only used to indicate a relationship relative to the predictive cache, and that the primary cache may be any cache in a hierarchy of data processing system caches. In response to an access request to the main memory of a first main memory data block which results from a first cache memory miss, such that the first cache memory does not contain the first main memory data block, a second main memory data block is identified which was accessed following a previous access request to the main memory for the first main memory data block. Upon identification of the second main memory data block, the second main memory data block is stored in the second cache memory, if not already present.

By distributing the cache as described above, the first (primary) cache memory may be integrated onto a processor integrated circuit chip along with a microprocessor. The second (predictive) cache memory may be an on-chip Static RAM (SRAM) cache which is included on a DRAM integrated circuit chip along with a DRAM array. For example, an integrated circuit chip which is commonly known as a Synchronous DRAM (SDRAM) may be used. Other DRAM integrated circuits having on-chip SRAM, such as Cached DRAM (CDRAM) may also be used. Discrete DRAM and SRAM chips may also be used. A prediction unit is responsive to addresses on the main memory bus which connects the processor integrated circuit chip to a plurality of DRAM integrated circuit chips. The prediction unit predicts future accesses to data blocks in the DRAM arrays as a result of a primary cache miss, and prefetches the data blocks from the DRAM arrays into the SRAM cache. Improved performance of microprocessor chips having on-chip cache is therefore obtained.

It will be understood by those having skill in the art that predictive cache memory systems and methods according to the invention may prefetch a plurality of main memory blocks which were accessed following the previous access request to the main memory. In other words, in order to improve the efficiency of prefetching, a plurality of predicted data blocks may be prefetched rather than prefetching only a single next predicted data block. Moreover, the second main memory block may be identified in the Prediction Table by referencing a combination of the first main memory block and at least one additional main memory data block, so that more accurate prediction schemes based on multiple sequences of memory blocks may be used. In this case, the Prediction Table may store the results of a hashing function based on combinations of earlier data block requests. In any event, accurate prediction is provided with minimal additional overhead and without the need to investigate and detect the internal workings of large scale programs.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
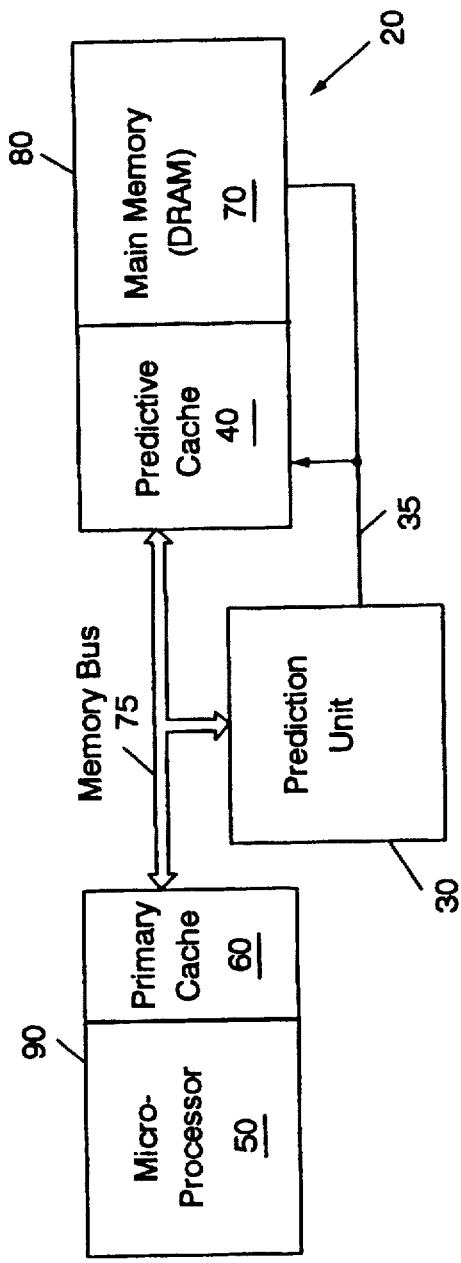
FIG. 1 is a block diagram illustrating a data processing system including a predictive cache memory subsystem according to the present invention.

Referring now to FIG. 1, a data processing system including a predictive cache memory subsystem according to the present invention will now be described. As shown in FIG. 1, data processing system 20 includes a processor 50, for example a microprocessor, and a primary cache 60. As is well known to those having skill in the art, microprocessor 50 and primary cache 60 may be integrated onto a microprocessor integrated circuit chip 90. However, cache 60 and processor 50 may be formed on different chips as well.

Still referring to FIG. 1, data processing system 20 includes main memory 70 which may be implemented using Dynamic Random Access Memory (DRAM). As is well known to those having skill in the art, cache 60 stores therein data blocks from main memory 70 which are being used by the processor 50. Upon occurrence of a cache miss, data blocks are read from main memory 70 into cache 60 via main memory bus 75.

Still referring to FIG. 1, a predictive cache memory subsystem according to the present invention includes a Prediction Unit 30 and a predictive cache 40. Prediction Unit 30 monitors access requests to main memory 70 via main memory bus 75, which indicates that a cache miss on primary cache 60 has occurred. Prediction Unit 30 predicts where the next main memory access will occur after the main memory access which caused the cache miss. In particular, Prediction Unit 30 operates as an identifying means which is responsive to an access request to main memory 70 for a first main memory data block, for identifying a second main memory data block which was accessed following a previous access request to the main memory 70 for the first main memory data block. Prediction Unit 30 also functions as storing means which is responsive to the identifying means, for storing the second main memory data block in predictive cache memory 40 if the second main memory data block is not already stored in the predictive cache memory 40. Prediction Unit 30 controls the fetching of data blocks from main memory 70 to predictive cache 40 via prediction unit control bus 35.

It will be understood by those having skill in the art that predictive cache 40 may be included as part of Prediction Unit 30 and may access main memory 70 via main memory bus 75. However, in order to provide a high speed predictive cache subsystem, predictive cache 40 is preferably implemented as an SRAM buffer which is integrated on a DRAM integrated circuit chip 80 with main memory 70. Thus, memory accesses between predictive cache 40 and main memory 70 may occur via the internal data bus (not shown in FIG. 1) of integrated circuit chip 80 at high speeds and independent of memory accesses on main memory bus 75.

Presently, many types of DRAM chips include small SRAM buffers thereon. One example of such an integrated circuit chip 80 is a Synchronous DRAM (SDRAM) chip, such as the Model No. KM416S1120A marketed by Samsung. Another example is a Cached DRAM (CDRAM) chip, such as the Model No. M5M44409TP marketed by Mitsubishi. Because the use of on-chip cache for the predictive cache improves the speed of the predictive cache memory subsystem, the invention will be described using on-chip predictive cache.

Figure 2:
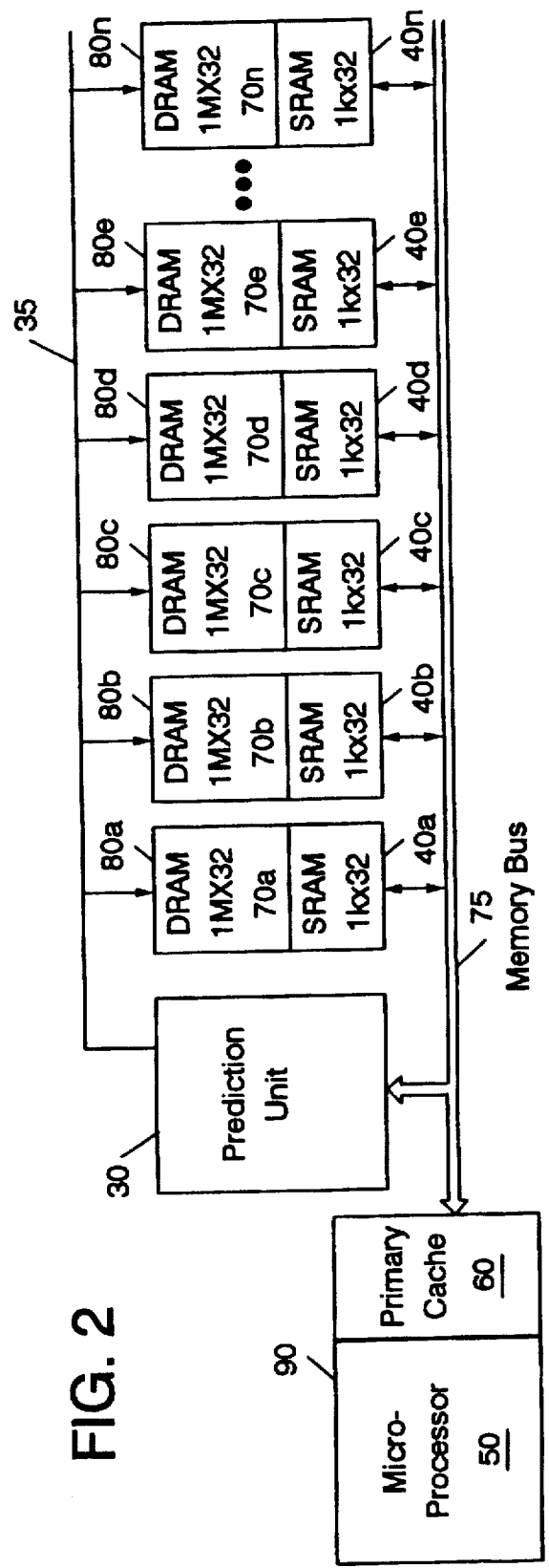
FIG. 2 is a detailed block diagram of a data processing system including a predictive cache memory subsystem according to the present invention.

Referring now to FIG. 2, a distributed predictive cache system according to the invention will be described. As shown in FIG. 2, main memory 70 is formed of a plurality of SDRAM chips 80a–80n. Each SDRAM chip 80a–80n includes a 1 Mbit×32 main memory (DRAM) array 70a–70n, and a 1 Kbit×32 SRAM buffer 40a–40n.

Figure 3:
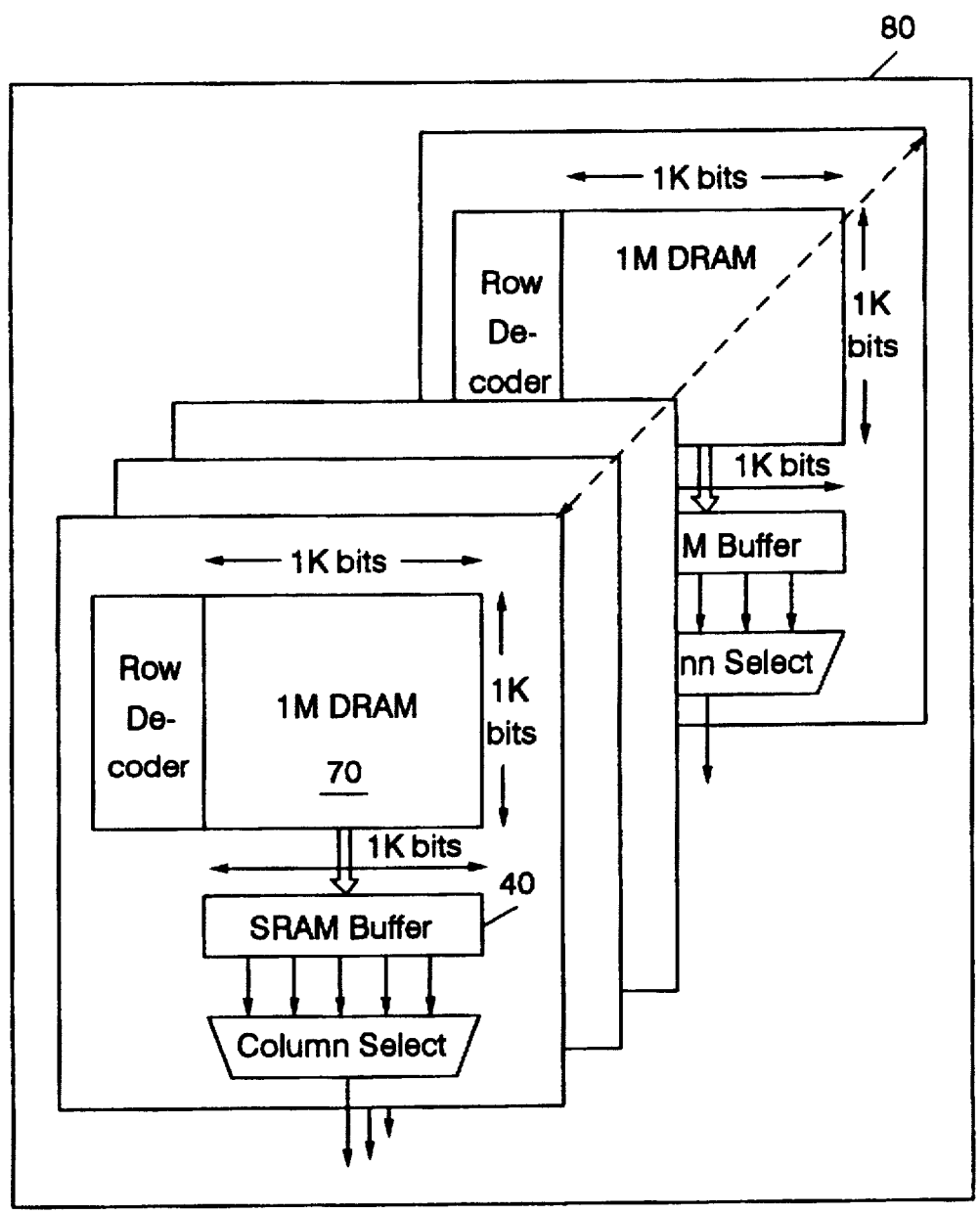
FIG. 3 is a block diagram illustrating the internal architecture of the SDRAM chips of FIG. 2.

FIG. 3 illustrates the internal architecture of the SDRAM chips, for example chip 80n. Each chip 80 has a large DRAM array 70 augmented by a small fast SRAM buffer 40. By performing a Row Address Strobe (RAS) operation, a single row of bits is transferred from the DRAM array 70 into the SRAM buffer 40. As shown in FIG. 3, the 1 Mbit DRAM is formed of a 1 Kbit×1 Kbit array. In one RAS operation, one row of 1 Kbits is transferred from a DRAM array into the SRAM buffer. A typical cycle of precharge and RAS operations is performed in 100–150 ns. In contrast, the bits in the SRAM buffer can be accessed in a 10 ns cycle.

Referring again to FIGS. 1 and 2, an overview of the operation of Prediction Unit 30 will now be described. Prediction Unit 30 monitors the main memory requests by processor 50 (i.e. primary cache misses) and satisfies these requests. In addition, Prediction Unit 30 uses a prediction scheme, described in detail below, to preload into predictive cache 40 data blocks that are likely to be referenced next by the processor 50. The Prediction Unit 30 checks each memory request on memory bus 75 to see if it can be filled by addressing the predictive cache 40. If the data is in the predictive cache 40, the memory request is granted immediately. If not, a normal memory read or write cycle is performed to obtain the data block from main memory 70 at relatively low speed.

The current memory request is also used to predict the next one or more memory requests. If the predicted requests require data that is currently not in the predictive cache 40, the Prediction Unit 30 loads data from main memory 70 into the predictive cache 40 in anticipation of the incoming memory request.

The Prediction Unit 30 also monitors the prediction. If the prediction was successful, that is the next memory request from processor 50 was in the data block which was predicted, the same prediction will be used the next time. If the predict-on was not successful, that is the next memory request from processor 50 did not correspond to the predicted data block, the Prediction Table is updated to reflect the change.

Accordingly, the Prediction Unit 30 loads the predictive cache 40 with data blocks that are likely to be requested by the processor 50 in the future. If the data requested by the processor in the future is in the predictive cache, the memory access is completed very rapidly, for example on the order of 10–30 ns with current technology. On the other hand, if the processor 50 requests data that is not in the predictive cache, the access time to main memory is much longer, for example 100–150 ns.

Figure 4:
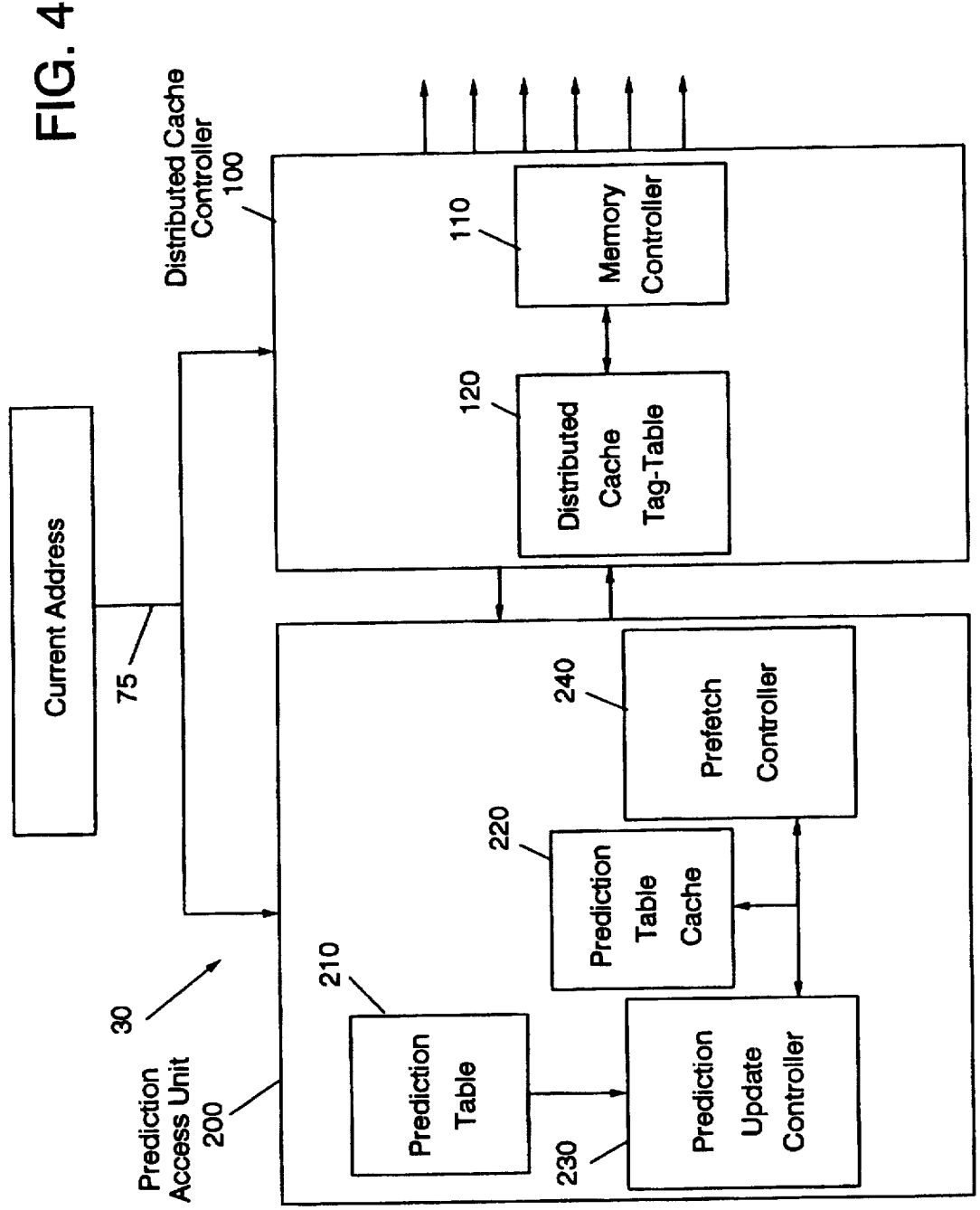
FIG. 4 is a block diagram illustrating the components of the Prediction Unit of FIGS. 1 and 2.

Referring now to FIG. 4, a block diagram of the Prediction Unit 30 of FIGS. 1 and 2 is illustrated. As shown in FIG. 4, Prediction Unit 30 is formed of two main semi-independent controllers: Distributed Cache Control Unit 100 and Access Prediction Unit 200. Distributed Cache Control Unit 100 services all main memory access requests. These requests include all the memory read requests from the processor 50 that missed the primary cache 60, and memory store requests. In addition, the Distributed Cache Control Unit 100 provides a memory refresh function according to techniques well known to those having skill in the art. Detailed operations of the Distributed Cache Control Unit will be described in connection with FIGS. 5 and 6 below.

The second unit is the Access Prediction Unit 200. In general, Access Prediction Unit 200 includes a Prefetch Controller 240 which monitors the main memory requests over main memory bus 75, and uses a Prediction Table 210 to predict what memory request is likely to come next. Prefetch Control Unit 240 then checks to see if the expected data is in the predictive cache 40. If it is not, Prefetch Control Unit 240 fetches the data from the main memory 70 into the predictive cache 40. Access Prediction Unit 200 also includes a Prediction Update Controller 230 which monitors whether the last prediction was correct or not. If the prediction was not correct, the Prediction Update Controller 230 updates the Prediction Table 210. The Prediction Table itself may be cached, using a Prediction Cache 220, in order to reduce the access time to the Prediction Table, as described below.

Detailed operations for the Prediction Unit 30 will be described in connection with FIGS. 5–10. For the detailed description which will now follow, a specific memory configuration will be described. It will be understood by those having skill in the art that other memory configurations may be used. For purposes of description, a processor 50 with 32 bit words is assumed. An internal primary cache 60 on the processor chip 90 is assumed to have a cache line size of 32 bytes (8 words). A main memory 70 with a total of 64 Mbytes is assumed. The main memory is made of 32 bit wide modules. Each module is formed of two 1 Mbyte×16 SDRAM chips 80. Alternatively, eight 1 Mbyte×4 SDRAM chips 80 may be used. Internal chip 80 is a 1 Kbit×16 SRAM buffer. Accordingly, each 1 Mbit word module has a 1 Kbit word SRAM buffer (predictive cache).

Main memory 70 is four-way interleaved on 1Kword boundaries. In other words, the memory is divided into four groups of four modules. The first four Mwords are in the first group (referred to as Group-0). The second four Mwords are in the second group (Group-1), etc. In each group, the first one Kwords are in Module 0, the second one Kwords are in Module 1. The third set of one Kwords is in Module 2, and the fourth set of one Kwords is in Module 3. The next one Kwords are in Module 0. Accordingly, in performing a read operation, a module is selected with one RAS operation. 1K×32 bits (1Kwords) are transferred from the main memory (DRAM) array 70 into the predictive cache (SRAM buffer) 40. Accordingly, there are a total of sixteen independent addressable SRAM buffers, with each buffer holding 1 Kwords or 4 Kbytes.

Figure 5:
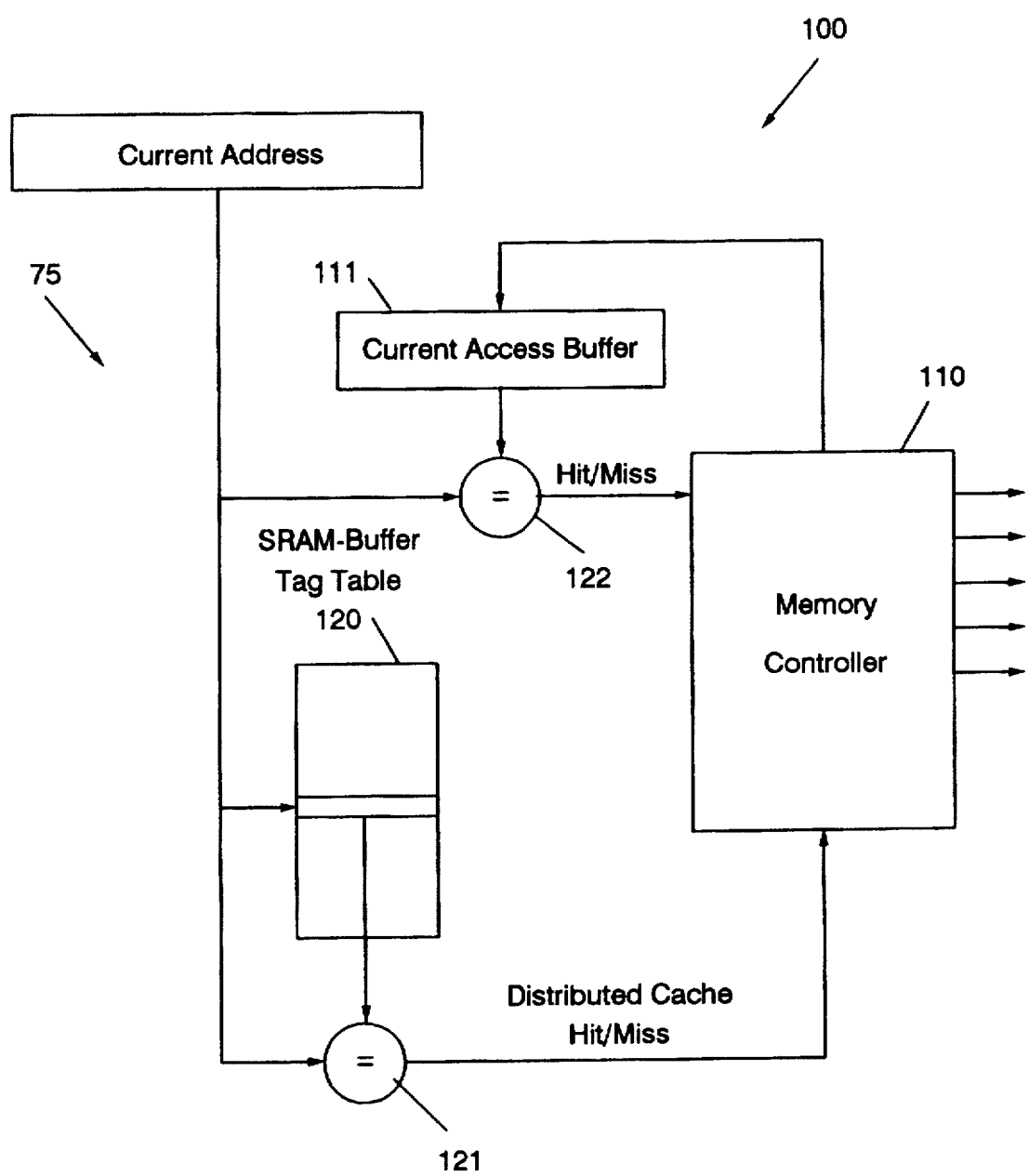
FIG. 5 is a detailed block diagram illustrating the components of the Distributed Cache Control Unit of FIG. 4.

Referring now to FIG. 5, a detailed block diagram of Distributed Cache Control Unit 100 is illustrated. The Distributed Cache Control Unit 100 services all processor memory requests from primary cache 60. The Unit 100 performs the tasks of a secondary cache control unit, along with the tasks of a regular dynamic memory control unit. Accordingly, operation of the Unit 100 is similar to an external (secondary) cache unit. The Unit 100 has a sixteen entry SRAM Buffer Tag Table 120, with one entry for each independent SRAM buffer. Each entry in the SRAM Buffer Tag Table is 10 bits wide, holding the row address of the data currently in the SRAM buffer of a chip 80. Accordingly, the Distributed Cache Control Unit 100 together with the SDRAM modules 40, form a secondary (predictive) cache unit with a very wide cache line of 4 Kbytes.

Figure 6:
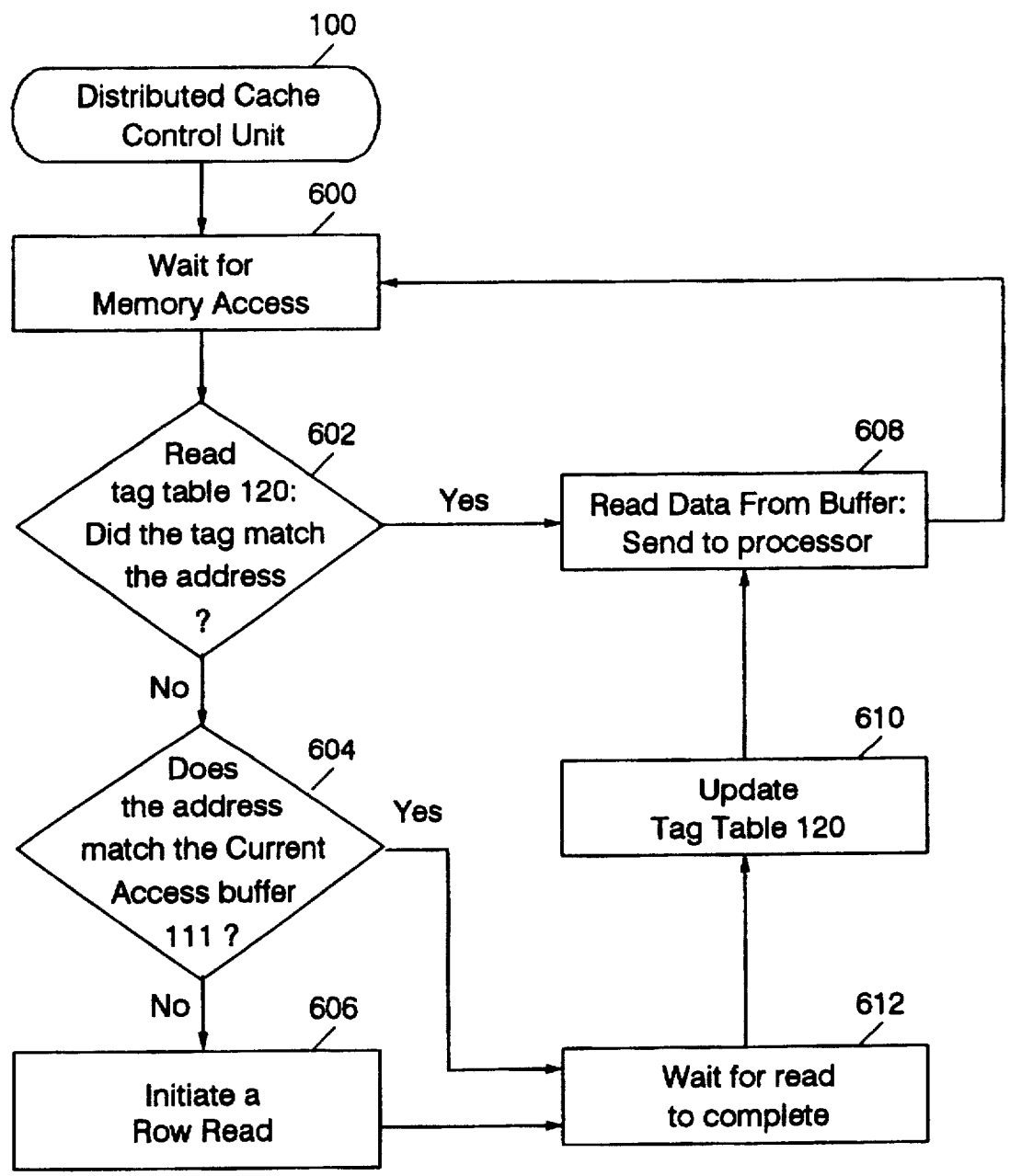
FIG. 6 is a flowchart illustrating operations performed by the Distributed Cache Control Unit of FIG. 5.

Detailed operation of Distributed Cache Control Unit 100 (FIG. 5) will now be described in connection with the flowchart of FIG. 6. Operations begin by Memory Controller 110 waiting for a memory access at Block 600. When a read request is present, indicating that a primary cache miss has occurred, Memory Controller 110 checks whether the data is in any of the sixteen predictive cache (SRAM) buffers 40, using the bits <AD|12:13|,AD|24:25|>of the current memory address (via bus 75) as the address into the SRAM Buffer Tag Table 120, using comparator 121. See Block 602. If the tag matches bits AD|14:23|, indicating a predictive cache hit, then at Block 608, the data is transferred to the processor 50 from the predictive cache 40.

On the other hand, at Block 604, if the bits AD[14:23] do not match, indicating a cache miss, the Distributed Cache Controller 100 checks the Current Access Buffer 111 to see if the address matches the RAS operation currently in progress using comparator 122, at Block 604. A match indicates that an RAS operation which is in progress will be obtaining the necessary data block from main memory 70. Accordingly, the RAS operation is completed at Block 612.

If the RAS operation which is in progress will not be obtaining the necessary data block from main memory, the Distributed Cache Control Unit 100 initiates a new RAS operation that matches the address of the data requested, at Block 606. In either case, when the RAS operation is complete at Block 612, the data is transferred from the predictive cache 40 to the processor 50 (Block 608) and the SRAM Buffer Tag Table 120 is updated at Block 610.

Referring again to FIG. 4, Access Prediction Unit 200 includes four primary components plus associated buffers and logic as described in detail below. The four primary components are:

1. A 1 Mbyte Prediction Table 210 which may be stored in a separate DRAM. Prediction Table 210 may be organized as 256K×16×2, that is 256K two-word entries, with each word being 16 bits wide. By organizing the table as two-word entries, two data blocks may be prefetched in response to a primary cache miss.

2. A 32 Kbyte fast SRAM Prediction Table cache 220 organized as 1K×16×2×8. Each cache line is 256 bits wide. The cache line holds 8 pairs of 16 bit words. There are a total of 1K data cache lines. The tag for the prediction cache has 1K entries, each entry being 4 bits wide.

It will be understood that Prediction Table cache 220 may be used to reduce the access time to the Prediction Table 210. Prediction Table 210 may be made sufficiently large to accommodate all memory accesses which are possible. However, in order to reduce the access time to the Prediction Table 210, and because Prediction Table 210 itself exhibits locality of reference, the Prediction Table itself can be cached using Prediction Table cache 220.

3. Prefetch Controller 240 is a finite state machine that uses the Prediction Table 210 and Prediction Table Cache 220 to predict the next memory access. Prefetch Controller 240 prefetches data if needed from the main memory 70 into predictive cache 40.

4. Prediction Update Controller 230. This controller monitors the predictions and maintains and updates the Prediction Table Cache 220 and the Prediction Table 210 based on the accuracy of the predictions.

Still referring to FIG. 4, the main memory address space is divided into equal size data blocks. For convenience, the data block size is a power of 2. For example, a data block size of 256 bytes is used. Preferably, the data block size is equal to or larger than the processor cache line size, since finer division will require more resources but will not yield better results. All references into each data block are considered to be the same reference.

Prediction Table 210 includes an entry for each data block. Each entry includes two 16 bit words. The two words in an entry hold two different main memory row addresses as predictions of which main memory row is going to be accessed after the processor 50 references a word in the data block corresponding to the entry. The predictions are based on past history. In particular, the Access Prediction Unit 200 continuously monitors main memory requests via main memory bus 75. It records the main memory row address (the most significant 14 bits AD[12:25] in the present example) for the access following the current access, and stores it in the Prediction Table entry of the current block, using the most significant 17 bits AD[9:25]. Thus, the entries in the Prediction Table 210 change over time. The controller keeps the last two different addresses as the best predictions.

Figure 7:
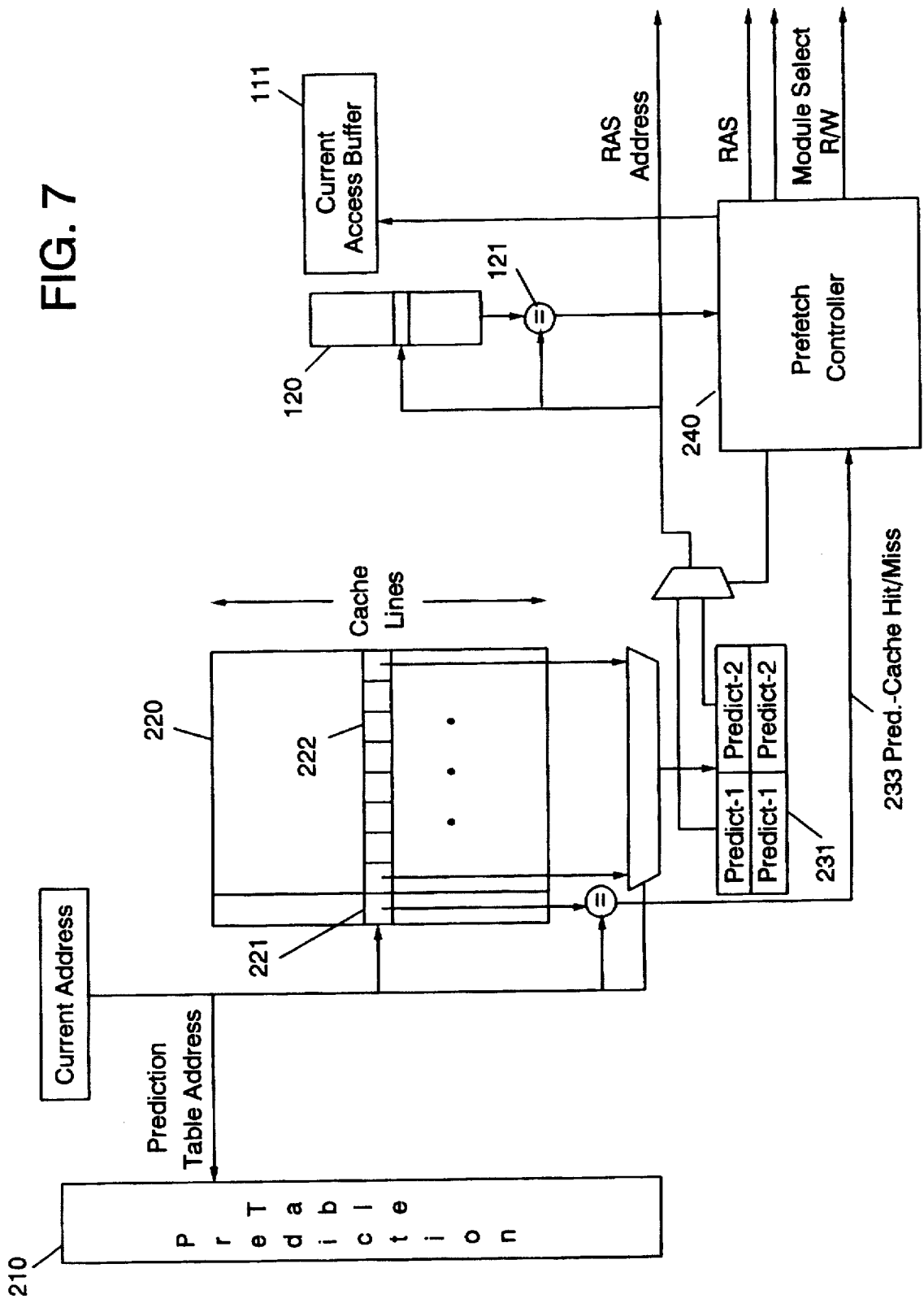
FIG. 7 is a detailed block diagram illustrating the components of the Prefetch Controller of FIG. 4.

Referring now to FIG. 7, a detailed block diagram of Prefetch Controller 240 and its supporting logic is illustrated. Operation of the Prefetch Controller 240 of FIG. 7 will now be described with the aid of the operational flow diagram of FIG. 8.

Still referring to FIG. 7, when a new memory request is issued by processor 50 upon occurrence of a primary cache miss (Block 802 of FIG. 8), the Prefetch Controller 240 uses the seventeen most significant bits of the current memory address AD[9:25] to access the Prediction Table Cache 220 and find the next two 16 bit addresses of the two blocks the processor is likely to reference next, at Block 804. Once found, the two prediction words are loaded into the Prediction Address Stack 231 (FIG. 7). If the data is not in the Prediction Table Cache 220, indicating a Prediction Table Cache miss, the controller checks to see if the data is in the Prediction Table SRAM buffer (Block 816). If the data is not in the Prediction Table SRAM buffer, the controller 240 reads the Prediction Table 210 (Block 812), updates the Prediction Table Cache 220 (Block 814) and loads the words into the Prediction Address Stack 231.

Figure 8:
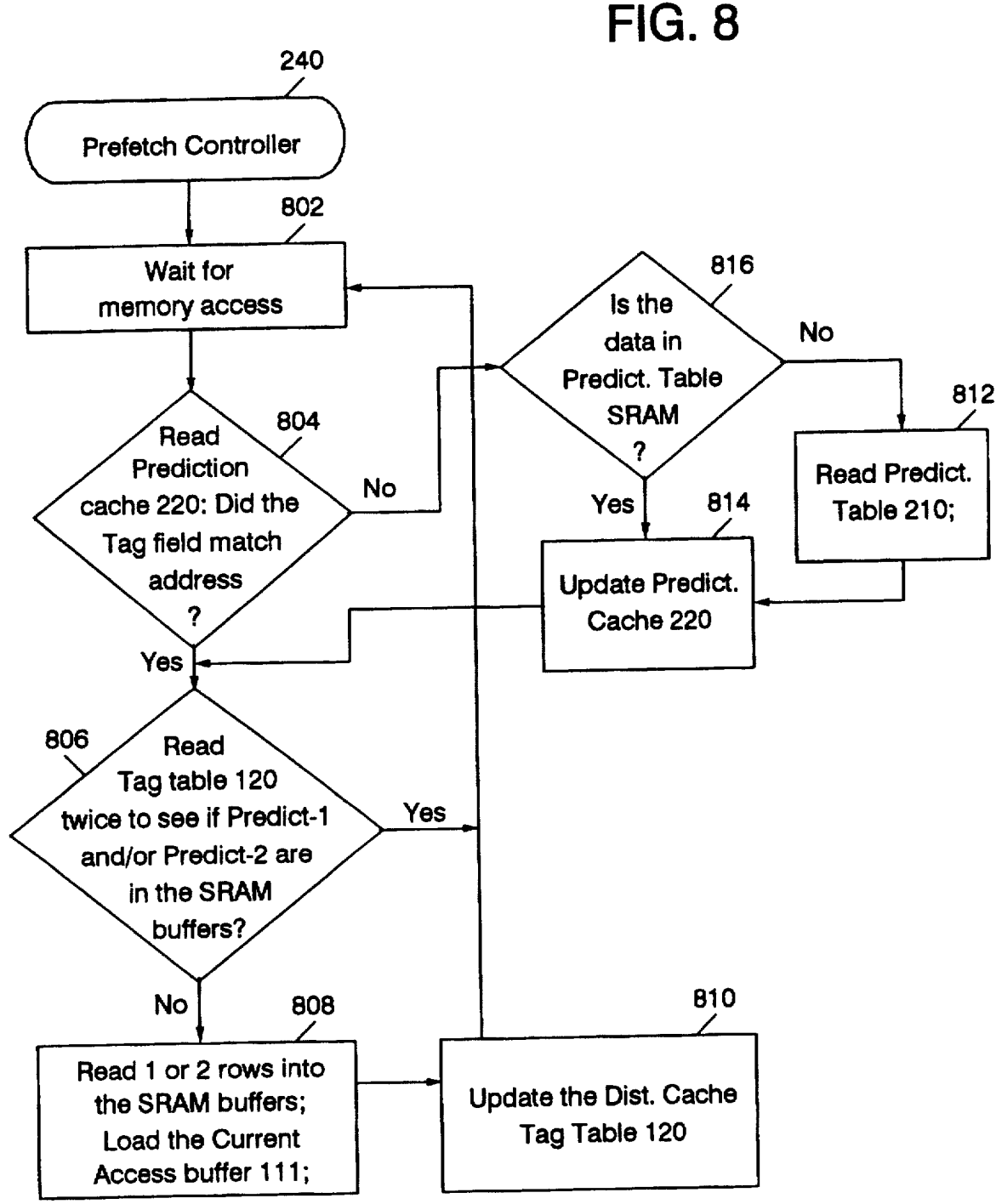
FIG. 8 is a flowchart illustrating operations performed by the Prefetch Controller of FIG. 7.

Continuing with the description of FIGS. 7 and 8, the Prefetch Controller 240 takes the two DRAM row-prediction from the top of the Prediction Address Stack 231 and checks whether the data associated with these addresses are in the predictive cache 40 (Block 806). This is performed using the Distributed Cache Tag Table 120 which is the same table used by the Distributed Cache Controller 110. Comparator 121 detects whether the prediction is already in the predictive cache 40 (Block 806). If any of the rows are not in the predictive cache 40, they are loaded into the predictive cache 40 (Block 808). Preferably, the second guess is loaded into a buffer only if there is no address conflict and the row can be loaded into a buffer different from the first guess. The Distributed Cache Tag Table 120 is then updated at Block 810.

To summarize the above operations, Prefetch Controller 240 of FIGS. 7 and 8 obtains two prediction words from the Prediction Table Cache 220 and loads the words into Prediction Address Stack 231. If the prediction words are not in the Prediction Table Cache, the Prediction Table 210 is accessed in order to load the words into the prediction cache and into the Prediction Address Stack 231. The prefetch unit uses the addresses to preload data into predictive cache 40.

Figure 9:
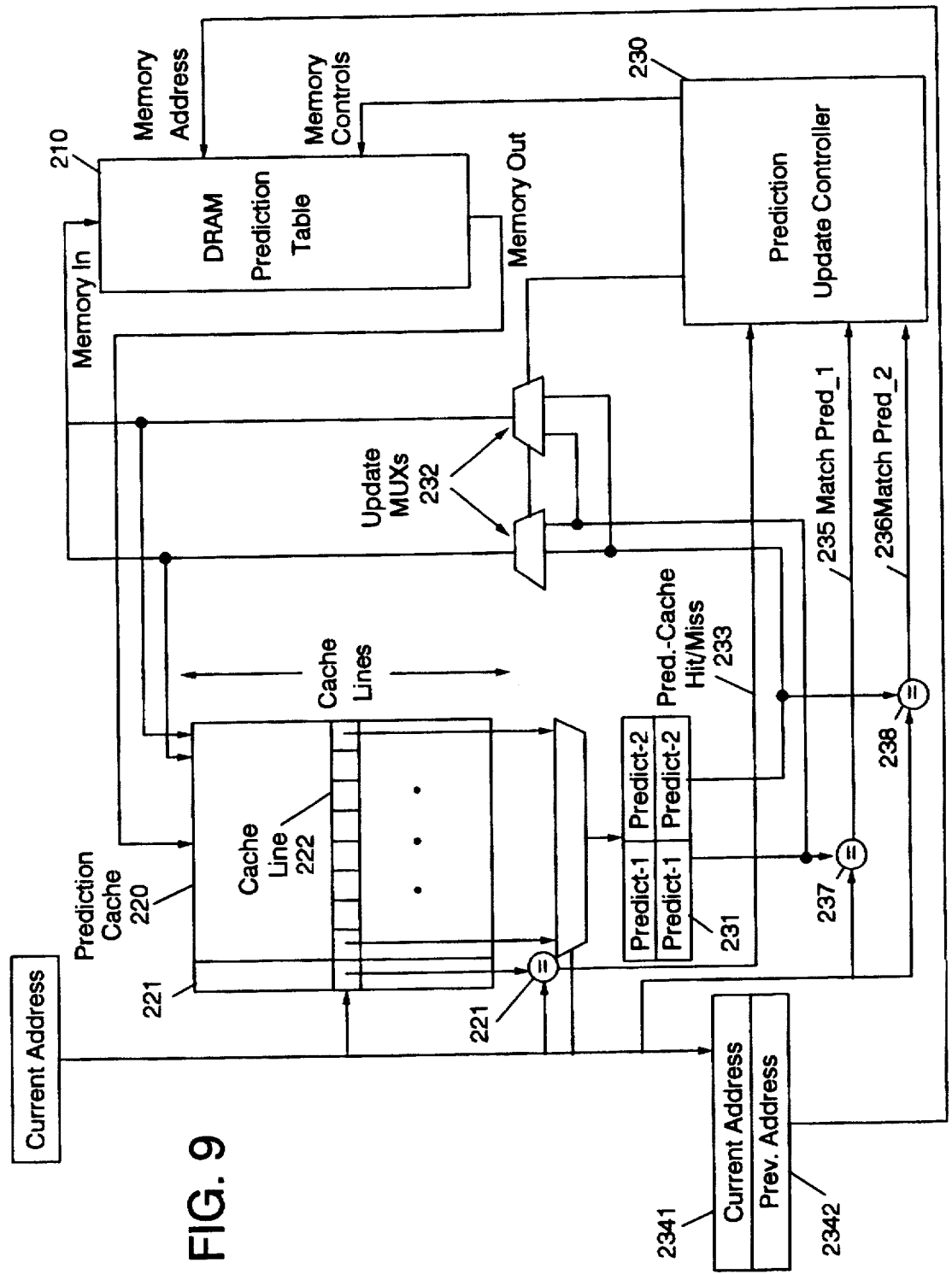
FIG. 9 is a detailed block diagram illustrating the components of the Prediction Update Controller of FIG. 4.

FIG. 9 is a detailed block diagram illustrating the components of Prediction Update Controller 230 (FIG. 4). Operation of Prediction Update Controller 230 will be explained using the operational flowchart of FIG. 10.

Figure 10:
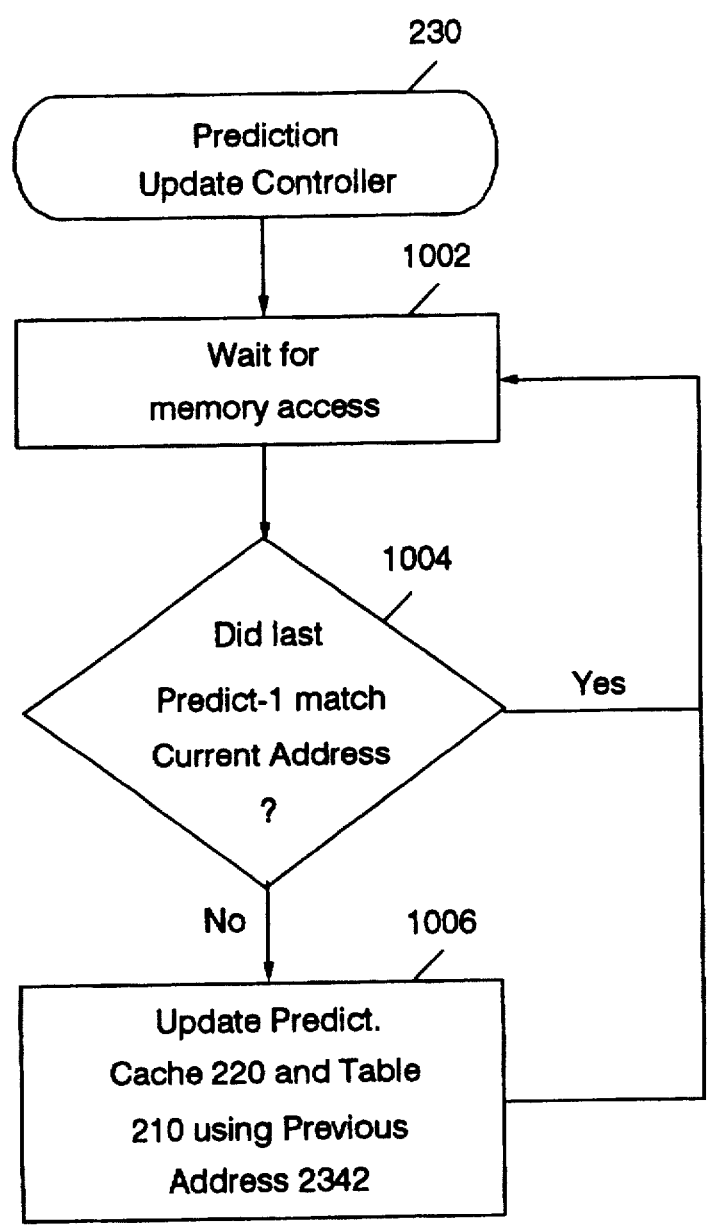
FIG. 10 is a flowchart illustrating operations performed by the Prediction Update Controller of FIG. 9.

Referring to FIGS. 9 and 10, concurrent with the operations of Prefetch Controller 240, Prediction Update Controller 230 operates to determine whether the previous prediction was correct based on the current memory address. If the previous prediction was correct, no updates are necessary for the Prediction Table. However, if the prediction was incorrect, the new memory address is replaced into the Prediction Table.

Detailed operations of Prediction Update Controller 230 will now be described. Prediction Update Controller 230 maintains a Prediction Address Stack 231 which is a two-entry double word stack. Prediction Address Stack 231 holds the current two prediction words (also referred to as a "first guess" and a "second guess" or "Predict-1" and "Predict-2") and the previous two prediction words. Associated with Prediction Address Stack 231 is a two-entry access address stack 234 which holds the current access address 2341 and the previous access address 2342.

Upon a main memory access (Block 1002), Prediction Update Controller 230 compares the two previous predicted words with the current main memory address. It uses outputs 235 and 236 of comparators 237 and 238 respectively to select new predictions via the update multiplexers 232. See Block 1004 of FIG. 10. Based on this comparison, the new first guess, second guess pair for the previous access is written back into the Prediction Cache 220. The previous access address 2342 is used to compute the cache address. See Block 1006 of FIG. 10.

If the current address matches the first predicted guess, no changes are made to the Prediction Table. If the current address matches the second guess for the previous access, then the first and second guesses are reversed so that the old second guess becomes the new first guess. Finally, if the current address does not match either of the first or second guesses, the current address becomes the new first guess and the old first guess becomes the new second guess. The old second guess is dropped. Accordingly, the Prediction Table is updated based on whether the current address actually matches one or the other of the predicted addresses.

FIGS. 7–10 illustrated the use of two predictions per Prediction Table entry. It will be understood that more than two predictions may be made per entry at the cost of making the Prediction Table and Prediction Table cache larger. Moreover, FIGS. 7–10 described prediction of the next main memory data block access. However, the next two or more sequential accesses may also be predicted. This may be implemented without changing the architecture described above by providing a prediction stack 231 and an access address stack 234 that are deeper. In particular, these stacks are two entries deep in FIGS. 7 and 9, but they can be made deeper for predicting a series of accesses.

FIGS. 1–10 also used Synchronous DRAM (SDRAM) chips to implement main memory 70 and predictive cache 40. It will be understood that Cached DRAM (CDRAM) may be used rather than SDRAM. CDRAM may yield higher performance than SDRAM for two reasons. First, the access to the SRAM buffer on a CDRAM is typically faster than on an SDRAM. In particular, it presently takes one clock cycle of 10 ns to access the CDRAM cache buffer while it takes three clock cycles to access the buffer of SDRAM memory. Second, there are 128 different cache lines associated with each DRAM block of a CDRAM, while only one SRAM buffer is connected to the DRAM bank of the SDRAM.

Figure 11:
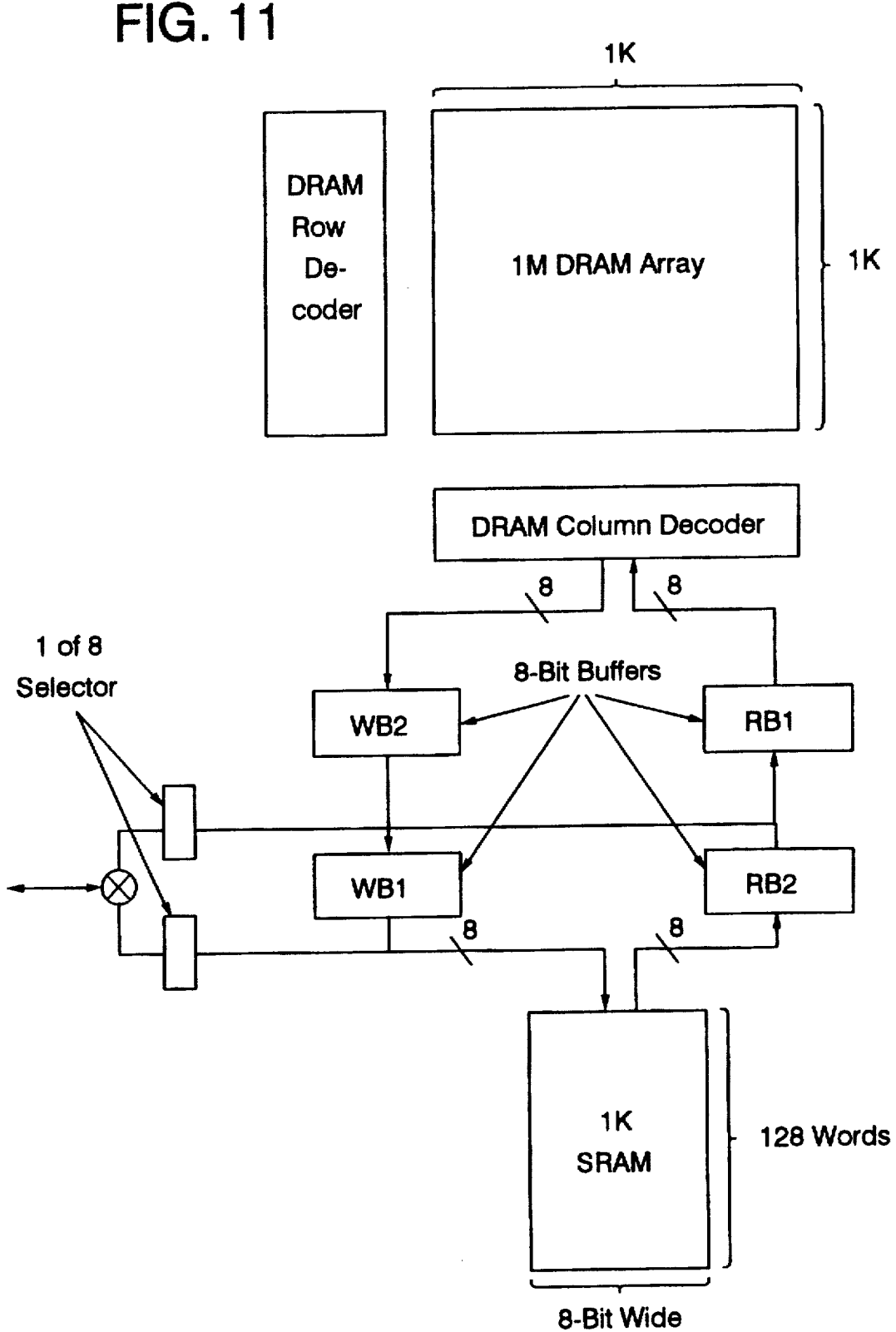
FIG. 11 is a block diagram illustrating one bit plane of a CDRAM architecture which may be used in a predictive cache memory subsystem according to the present invention.
Figure 12:
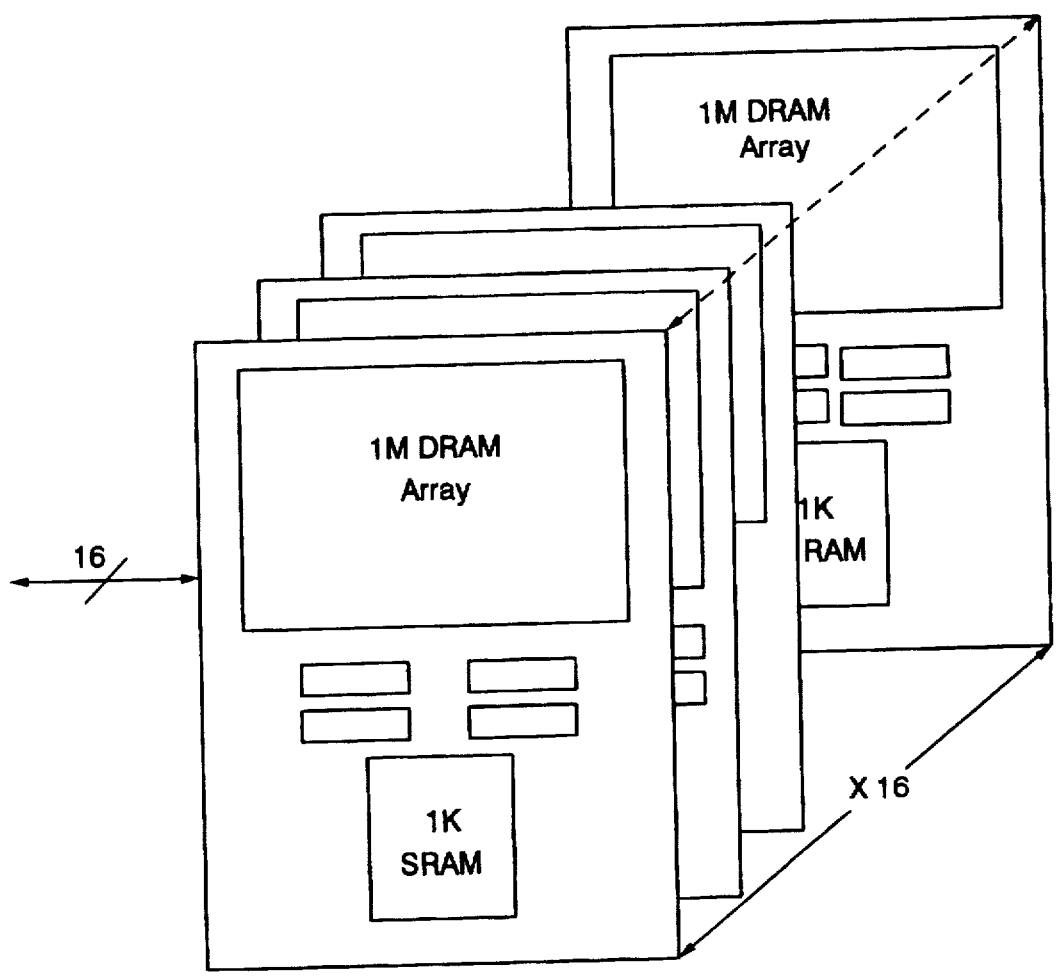
FIG. 12 illustrates a CDRAM chip which may be used in a predictive cache memory subsystem according to the present invention.

FIG. 11 illustrates one bit plane of a CDRAM architecture. FIG. 12 illustrates a CDRAM chip which contains 16 bit planes. The CDRAM chip of FIG. 12 may be used in the architecture described in FIGS. 4–10 by making only minor changes in the implementation detail. In particular, the Distributed Cache Tag Table 120 will have 128 times more entries, one for each SRAM line. Accordingly, in the example given above, tag table 120 will have 2048 entries for 64 Mbytes of memory. Each entry will have seven more bits since the lines in the CDRAM cache are only eight words wide rather than 1024 words wide. The Prediction Cache 220 will be slightly larger since each prediction pair of words will require fourteen more bits. Similarly, Prediction Table 210 will be slightly larger since each prediction pair of words will require fourteen more bits.

It will also be understood by those having skill in the art that instead of using the current address only to predict the next address, a combination of last accesses can be used to predict the next access or a series of next accesses. Unfortunately, if combinations of previous accesses are used to predict a subsequent access, a large number of possible pairs or triplets of accesses may need to be contained in the Prediction Table.

In order to utilize multiple prior accesses without requiring an excessively large Prediction Table, the Prediction Table need not hold all possible patterns or all patterns that actually occurred while running the program. The Prediction Table only needs to be sufficiently large to hold enough patterns so that predictions based on hits into the table predict correctly enough of the time to reduce the average access time by a significant amount. Simulations indicate that a Prediction Table that is about 5%–10% of the size of the total DRAM in the system yields very good results.

The Prediction Table can be organized for multiple accesses using a HASH function that assigns a position in a Prediction Table to each access as follows: If the last three accesses are a, b and c, and d is the current access, the Prediction Table stores d at location HASH (a, b, c) in the Prediction Table. Stated algebraically:

Prediction Table [HASH(a, b, c)]:=d. Any HASH function that scrambles the bits of a, b and c may be used, as known by those skilled in the art.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A predictive cache memory subsystem for a data processing system including a main memory, said predictive cache memory subsystem comprising:

cache memory means for storing therein data blocks from said main memory;

identifying means, responsive to an access request to said main memory for a first main memory data block which results from a cache miss, such that said first main memory data block is not present in said cache memory means, for identifying a second main memory data block which was accessed following an immediately preceding access request to said main memory for said first main memory data block, said identifying means being nonresponsive to a cache hit wherein said first main memory data block is present in said cache memory means; and storing means, responsive to said identifying means, for storing said second main memory data block in said cache memory means if said second main memory data block is not already stored in said cache memory means.

2. A predictive cache memory subsystem according to claim 1 further comprising:

updating means, responsive to an access request to said main memory for a third main memory data block following said access request to said main memory for said first main memory data block, for replacing identification of the second main memory data block with identification of the third main memory data block.

3. A predictive cache memory subsystem according to claim 1 wherein said identifying means comprises:

a prediction table, for storing therein identifications of a plurality of succeeding main memory data blocks, each of which was accessed following an access request to a corresponding one of a plurality of preceding main memory data blocks; and means, responsive to an access request to said first main memory data block, for indexing into said prediction table using the address of said first memory block, to thereby obtain identification of said second main memory data block.

4. A predictive cache memory subsystem according to claim 3 wherein said storing means comprises:

means, responsive to said prediction table containing identification of said second main memory data block, for determining if the second main memory data block is stored in said cache memory means; and means, responsive to the second data block not being stored in said cache memory means, for obtaining said second data block from said main memory, and for storing the second data block in said cache memory means.

5. A predictive cache memory subsystem according to claim 1 wherein said second main memory data block comprises a plurality of second main memory data blocks which were accessed following said previous access request to said main memory for said first main memory data block.

6. A predictive cache memory subsystem according to claim 1 wherein said identifying means identifies a second main memory block which was accessed following a previous access request to said main memory for a combination of said first main memory block and at least one additional main memory block, using a HASH function.

7. A predictive cache memory subsystem according to claim 1:

wherein said cache memory means comprises a first cache memory and a second cache memory;

wherein said identifying means is responsive to an access request to said main memory of a first main memory data block which results from a first cache memory miss, such that said first cache memory does not contain said first main memory data block; and wherein said storing means stores said second main memory data block in said second cache memory.

8. A predictive cache memory subsystem according to claim 7 wherein said first cache memory is integrated into a first integrated circuit along with a microprocessor, and wherein said second cache memory is integrated into a plurality of second integrated circuits along with said main memory.

9. A predictive cache memory subsystem according to claim 8 wherein said plurality of second integrated circuits comprise a plurality of DRAM integrated circuits, including on-chip SRAM buffer.

10. A predictive cache memory subsystem for a data processing system including a primary cache and a main memory, said predictive cache memory subsystem comprising:

a predictive cache, for storing therein data blocks from main memory which are not in said primary cache, and which are predicted to be used by said data processing system;

a prediction table which stores therein identifications of a plurality of succeeding main memory data blocks, each of which was accessed following an access request to a corresponding one of a plurality of preceding main memory data blocks;

a prefetch controller which is responsive to a first access request by said primary cache to a first main memory data block which results from a cache memory miss, such that said first main memory data block is not in said primary cache, to index into said prediction table to obtain the stored identification of a second main memory block which was accessed following an immediately preceding access request to said first main memory data block, and to fetch the second main memory block from said main memory into said predictive cache if said second main memory block is not already in said predictive cache, said prefetch controller being nonresponsive to a primary cache hit wherein said first main memory data block is present in said primary cache; and an update controller which is responsive to a second access request by said primary cache to main memory following said first access request, for replacing the stored identification of said second main memory block in said prediction table, with an identification of the memory block which is accessed during said second access request, if said second access request does not access said second main memory block.

11. A predictive cache memory subsystem according to claim 10 wherein said prediction table further comprises:

a prediction table cache which stores therein identifications of a portion of said plurality of succeeding main memory blocks from said prediction table, such that said prefetch controller and said update controller access said prediction table cache if said stored identification of said second main memory block is stored in said prediction table cache.

12. A predictive cache memory subsystem according to claim 10 wherein said prefetch controller indexes into said prediction table to obtain the stored identification of a plurality of second main memory data blocks which were accessed following said previous access request to said main memory for said first main memory data block.

13. A predictive cache memory subsystem according to claim 10 wherein said prefetch controller indexes into said prediction table to obtain the stored identification of a second main memory block which was accessed following a previous access request to said main memory, using a HASH function of said first main memory block and at least one additional main memory block.

14. A predictive cache memory subsystem according to claim 10 wherein said primary cache is integrated into a first integrated circuit along with a microprocessor, and wherein said predictive cache is integrated into a plurality of second integrated circuits along with said main memory.

15. A predictive cache memory subsystem according to claim 14 wherein said plurality of second integrated circuits comprise a plurality of DRAM integrated circuits, including on-chip SRAM buffer.

16. A predictive cache memory method for a data processing system including main memory and cache memory for storing therein data blocks from said main memory, said predictive cache memory method comprising the steps of:

identifying a second main memory data block which was accessed following an immediately preceding access request to said main memory for a first main memory data block, in response to an access request to said main memory for said first main memory data block which results from a cache miss such that said first main memory data block is not present in said cache memory, while ignoring a cache hit wherein said first main memory data block is present in said cache memory; and storing said second main memory data block in said cache memory if said second main memory data block is not already stored in said cache memory.

17. A method according to claim 16 further comprising the step of:

replacing identification of the second main memory data block with identification of a third main memory data block, in response to an access request to said main memory for a third main memory data block following said access request to said main memory for said first main memory data block.

18. A method according to claim 16 wherein said identifying step comprises the steps of:

storing in a prediction table identifications of a plurality of succeeding main memory data blocks, each of which was accessed following an access request to a corresponding one of a plurality of preceding main memory data blocks; and indexing into said prediction table using the address of said first memory block, to thereby obtain identification of said second main memory data block.

19. A method according to claim 18 wherein said storing step comprises the steps of:

determining if the second main memory data block is stored in said cache memory, in response to said prediction table containing identification of said second main memory data block;

obtaining said second data block from said main memory in response to the second data block not being stored in said cache memory; and storing the second data block in said cache memory.

20. A method according to claim 16:

wherein said cache memory comprises a first cache memory and a second cache memory;

wherein said identifying step is responsive to an access request to said main memory of a first main memory data block which results from a first cache memory miss, such that said first cache memory does not contain said first main memory data block; and wherein said storing step comprises the step of storing said second main memory data block in said second cache memory.

21. A predictive cache memory method for a data processing system including a primary cache, a main memory, and a predictive cache which stores therein data blocks from main memory which are not in said primary cache and which are predicted to be used by said data processing system; said predictive cache memory method comprising the steps of:

storing in a prediction table identifications of a plurality of succeeding main memory data blocks, each of which was accessed following an access request to a corresponding one of a plurality of immediately preceding main memory data blocks;

indexing into said prediction table to obtain the stored identification of a second main memory block which was accessed following a previous access request to a first main memory data block in response to a first access request by said primary cache to said first main memory block which results from a cache memory miss, such that said first main memory data block is not in said primary cache, while ignoring a cache hit wherein said first main memory data block is present in said cache memory;

fetching the second main memory block from said main memory into said predictive cache if said second main memory block is not already in said predictive cache; and replacing the stored identification of said second main memory block in said prediction table, with an identification of a memory block which is accessed during a second access request, in response to said second access request by said primary cache to main memory following said first access request, if said second access request does not access said second main memory block.

22. A method according to claim 21 wherein said indexing step comprises the step of:

indexing into a prediction table cache which stores therein identifications of a portion of said plurality of succeeding main memory blocks from said prediction table, if said stored identification of said second main memory block is stored in said prediction table cache.

* * * * *